US006255637B1

United States Patent
Collett

(12) United States Patent
(10) Patent No.: US 6,255,637 B1
(45) Date of Patent: *Jul. 3, 2001

(54) MICROWAVE HEATING RINGS AND LIDS WITH WATER RESERVOIR, CUP HOLDERS AND SNAPS

(76) Inventor: Peter F. Collett, 801 N. Atlantic Ave., Cocoa Beach, FL (US) 32931

( * ) Notice: Subject to any disclaimer, the term of this patent is extended or adjusted under 35 U.S.C. 154(b) by 0 days.

This patent is subject to a terminal disclaimer.

(21) Appl. No.: 09/494,494

(22) Filed: Jan. 31, 2000

(51) Int. Cl.$^7$ ...................................................... H05B 6/80
(52) U.S. Cl. ........................... 219/732; 219/725; 219/763; 99/DIG. 14; 99/448; 220/573.5; 220/912
(58) Field of Search .................................. 219/725, 731, 219/732, 734, 735, 762, 763; 99/416, 417, 448, 418, 413, 415, DIG. 14; 126/369, 373, 377; 220/573.4, 573.5, 592.05, 912

(56) References Cited

U.S. PATENT DOCUMENTS

| | | |
|---|---|---|
| 106,457 | 8/1870 | Berry . |
| D. 355,735 | 2/1995 | Shaffer .................................. D32/53 |
| 797,660 | 8/1905 | Brooks . |
| 1,453,378 | 5/1923 | Clifford . |
| 1,793,298 | 2/1931 | Alaj ........................................ D7/540 |
| 1,948,778 | 2/1934 | Zoia .......................................... 65/59 |
| 3,642,165 | 2/1972 | Vonderosten ...................... 220/23.83 |
| 4,166,208 * | 8/1979 | Martel et al. .......................... 219/735 |
| 4,797,521 | 1/1989 | Liwski .............................. 219/10.55 |
| 4,847,461 | 7/1989 | Gilmore ............................ 219/10.55 |
| 4,883,935 * | 11/1989 | Fairchild et al. ..................... 219/734 |
| 4,941,401 | 7/1990 | Sarnoff ................................... 99/446 |
| 4,978,022 * | 12/1990 | Weick ................................... 219/734 |
| 5,028,754 | 7/1991 | Chiba ............................. 219/10.55 E |
| 5,069,198 | 12/1991 | Henderson ............................. 126/369 |
| 5,216,947 | 6/1993 | Cheng ..................................... 99/417 |
| 5,239,153 | 8/1993 | Beckett ......................... 219/10.55 E |
| 5,558,798 * | 9/1996 | Tsai ....................................... 219/731 |
| 5,866,885 * | 2/1999 | Collett ................................... 219/732 |

FOREIGN PATENT DOCUMENTS 50-119049 * 9/1975 (JP) ..................................... 219/731

* cited by examiner

Primary Examiner—Philip H. Leung
(74) Attorney, Agent, or Firm—Brian S. Steinberger; Law Offices of Brian S. Steinberger

(57) ABSTRACT

A stacking arrangement for simultaneously stacking plural food filled plates and beverage containers together for use in microwaves and refrigerators. Hollow rings with outwardly sloping sides each having side oval through-holes and upper edge grooves are placed on food filled plates so that the plates can be stacked on top of each hollow ring. A cover with outwardly sloping sides has a handle with a lid and through-hole adjacent to the handle covers the top food filled plate in the stack. The stack can be placed in a microwave, heating oven, refrigerator or freezer. The through-holes in the rings and the cover act as vents to allow heat to be evenly dispersed about the food and to allow the food to be more evenly cooked when being microwaved. The cover and rings can be made of microwaveable plastic such as polypropylene. When not being used the rings can together be inserted into the cover for storage. The cover can include separate indentations for storing uncovered food plates thereon, or beverages thereon. The separate indentations can include perforations for venting air therethrough. The indention(s) can include a water layer that helps prevent scorching and burning of food, plates, rings, and the lid when being used in high wattage microwaves. The cover or the cover and the lids can include internally facing protrusions on the lower edges for allowing the rings to be held within the cover when the cover and rings are not being used.

19 Claims, 8 Drawing Sheets

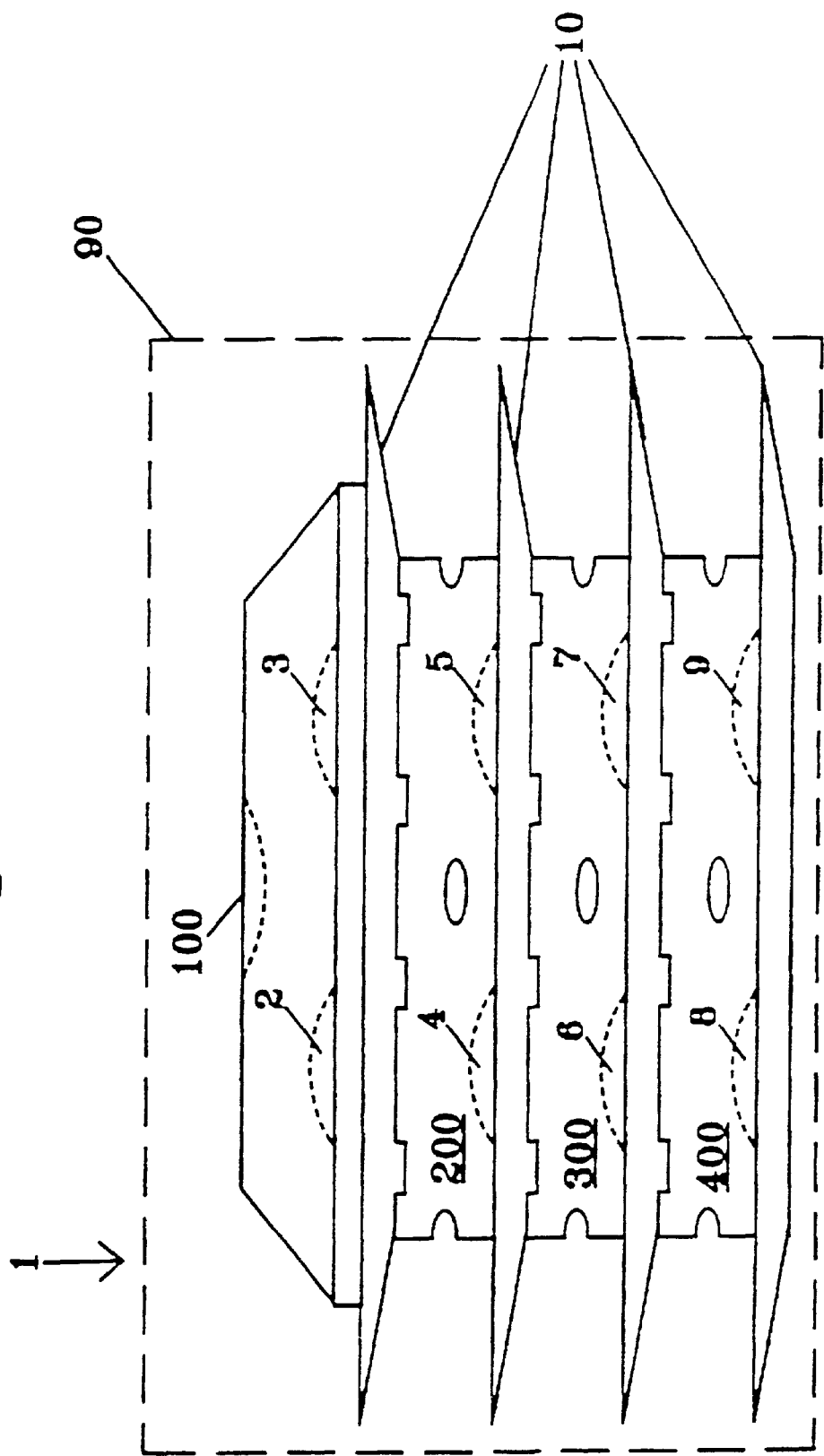

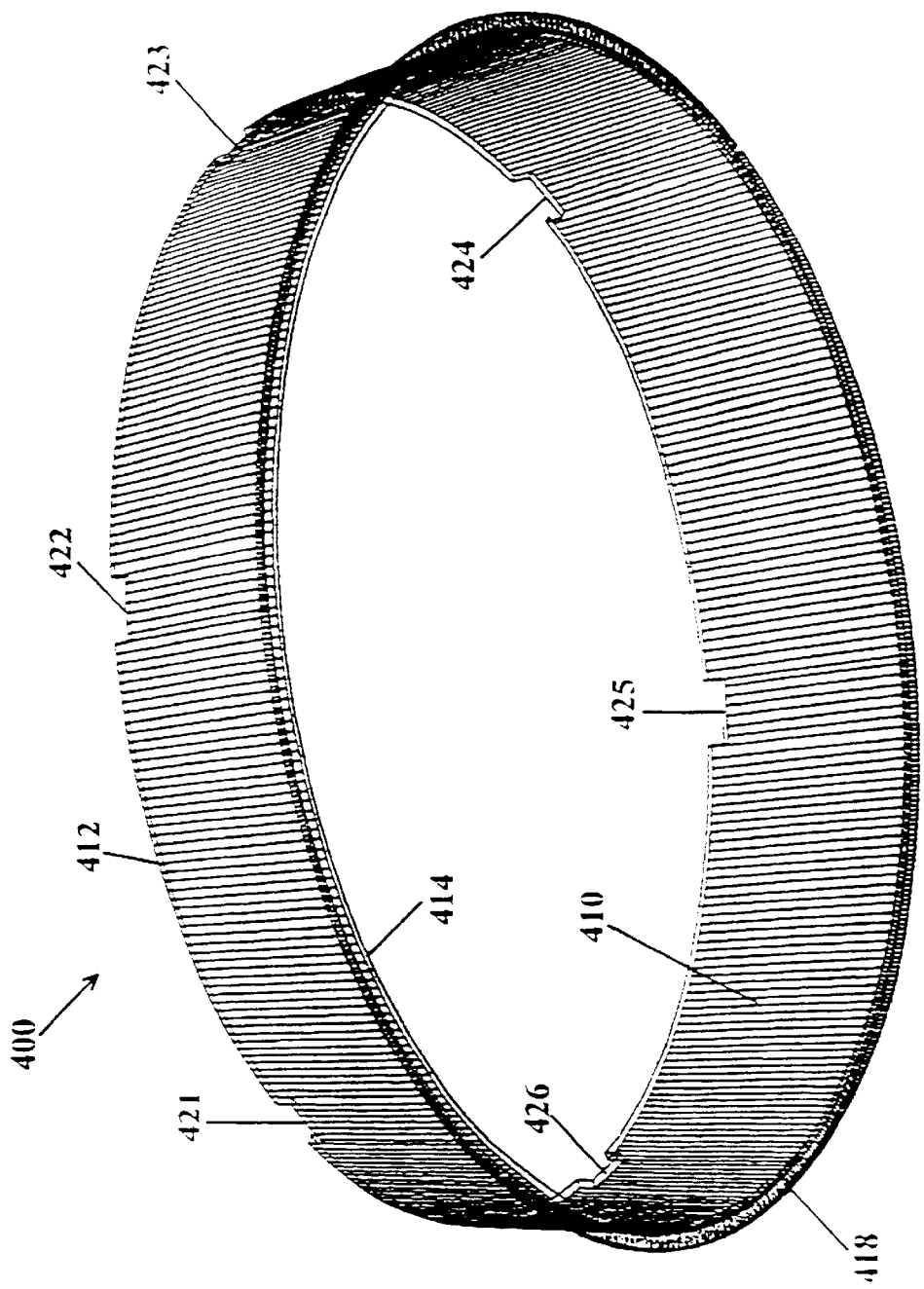

MICROWAVE HEATING RINGS AND LIDS WITH WATER RESERVOIR, CUP HOLDERS AND SNAPS

This invention relates to cooking and storage, and in particular to ring spacers and cover for allowing multiple plates of food to be simultaneously stacked for storage along with supporting beverage containers for use in refrigerators or for cooking in a microwave oven, and this invention is related to U.S. Pat. No. 5,866,885 to Collett, which is incorporated by reference.

BACKGROUND AND PRIOR ART

Microwave ovens have exploded in popularity for quickly heating food. Uncovered food in a microwave has a tendency to dry out over when being cooked. Plastic sheaths such as Saran® wrap have been used to cover single microwave plates. A microwaveable cooking hood has been used that completely covers about a single plate. See U.S. Pat. No. 5,028,754 to Chiba. However, none of the known prior art allows for having plural plates of food to be microwaved at one time. Often it important in both commercial use(i.e. restaurants) and residential home use to be able to simultaneously heat up plural food plates. Multiple plates cannot be adequately stacked on top of plastic sheath covered plates.

U.S. Pat. No. 4,847,461 to Gilmore describes a "stackable plate arrangement for microwave dishes", title. However, the Gilmore patent interconnects plural discs with vertical pole supports. The Gilmore device would require the user to build the structure as plates are being mounted on each level and then the entire structure with plural plates is inserted into a microwave oven. Besides the inherent difficulty of having to move the entire multi-level structure at one time, there are no covers for each of the multi-levels. One still has to use plastic sheathing and/or hood covers on each level.

U.S. Pat. No. 3,642,165 to Von der Osten describes a "stackable table service", title. However, this patent is directed toward creating a unique and uniform place settings of modifying existing plates to be somewhat bowl shaped with side extending rims, and separating insert plates therebetween. The elaborate Von der Osten device cannot be used with everyday type planar shaped plates that most people use to be microwaved. Von der Osten further does not allow for a cover for the top plate, and does not describe any use for being microwaved.

U.S. Pat. No. 1,793,298 to Alaj describes a "combination dish and cover", that appears in FIG. 2 to be stackable. However, the Alaj devices are basically flat-topped hood covers made from "metallic" type materials, that cannot be used in microwave ovens. Furthermore, each of the hoods requires covering lids with smooth sides that slope outward with thickened rim bases. The smooth sides do not allow users to be able to grip the hoods by their sides.

Covering food plates substantially with plastic sheaths and covers does not allow food to be evenly cooked and causes pressure to buildup under the closed covers. Furthermore sealing off the plates does causes all the different food on a plate to be contaminated and overpowered by other food so that the food taste becomes mixed.

SUMMARY OF THE INVENTION

The first objective of the present invention is to provide microwaveable rings and cover arrangement that allow multiple plates to be microwaved simultaneously in a stack arrangement.

The second object of this invention is to provide a rings and cover arrangement that allows plural plates of food to be separated from one another in a refrigerator or a microwave oven.

The third object of this invention is to provide microwaveable rings and cover arrangement that can be used with everyday microwaveable plates.

The fourth object of this invention is to provide microwaveable rings and a cover having slot-holes and grooves for allowing stacks of food filled plates to be evenly cooked.

The fifth object of this invention is to provide microwaveable rings and a cover having slot-holes and grooves for allowing heat emitted from stacks of food filled plates to be evenly dispersed and to eliminate internal pressure from building up.

The sixth object of this invention is to provide microwaveable rings and a cover having slot-holes and grooves to allow for air circulation about the food so that one food taste does not contaminate other foods on the same plate.

The seventh object of this invention is to provide for stacking multiple levels of food filled plates for storage in a refrigerator/freezer.

The eighth object of this invention is to provide a system for stacking plates of food and beverages to be simultaneously cooked in a microwave.

A preferred embodiment of the stacking arrangement combination includes a first plate, with a first hollow plastic ring being thereon, and through-hole slots in the ring for allowing air to circulate inside the first ring. A second plate can be positioned over the first hollow ring, and a plastic cover having a substantially closed lid portion having a handle with adjacent through-hole can substantially covers the upper surface of the second plate. The ring and cover allows the first plate and the second plate to be stacked on top of one another when placed in a microwave oven.

The first hollow ring further includes a raised rim edge about a base of the first hollow ring, wherein the upper edge of the ring has a larger diameter than the lower edge of the ring. The cover lid also has an upper edge with a larger diameter than the lower edge. The through-hole slots in the ring can include upper rectangular through-holes about an upper edge of the first hollow ring, and side oval through-holes in the first hollow ring.

All the novel rings can be stacked within one another and inserted within the lid cover so that the combined rings and cover can be easily stored for later use.

A second embodiment has indentations in the cover lid for supporting and holding beverage containers such as cups and mugs, so that the beverage containers can be cooked with food stacked underneath the cover lid. The cover lid can include a larger indentation for allowing a separate plate to be positioned on top of the lid so that uncovered food can be cooked while other food covered beneath the lid is being cooked. The indentations can include perforations therethrough in order to allow heat and air to circulate therethrough.

A third embodiment of the invention can include internally facing protrusions within the bottom edges of the lid cover and the rings for allowing the rings to be held in place within the lid cover.

Further objects and advantages of this invention will be apparent from the following detailed description of a presently preferred embodiment which is illustrated schematically in the accompanying drawings.

BRIEF DESCRIPTION OF THE FIGURES

FIG. 1 is a side view of an assembled stack of the rings, lid and plates of the novel invention.

FIG. 4 is a perspective view of another hollow ring for use with assembled stack of FIG. 1 without side oval vents.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 2A:
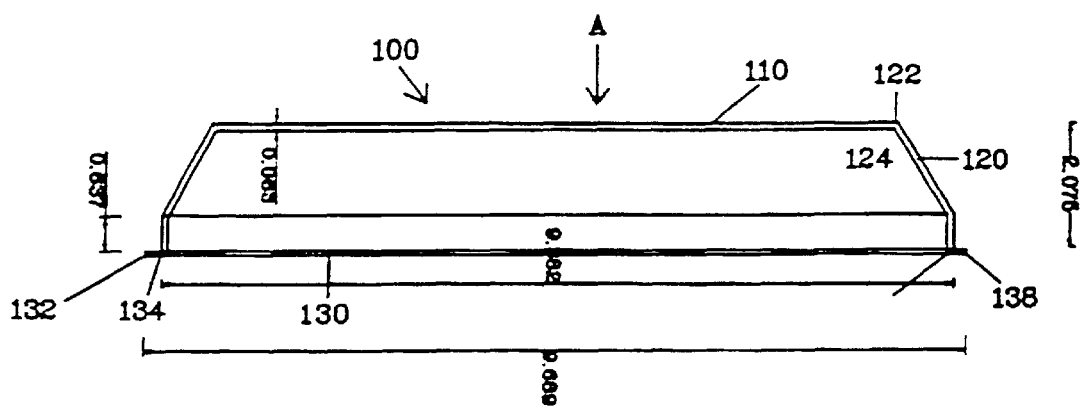
FIG. 2A is a side view of the lid cover used in FIG. 1.
Figure 2B:
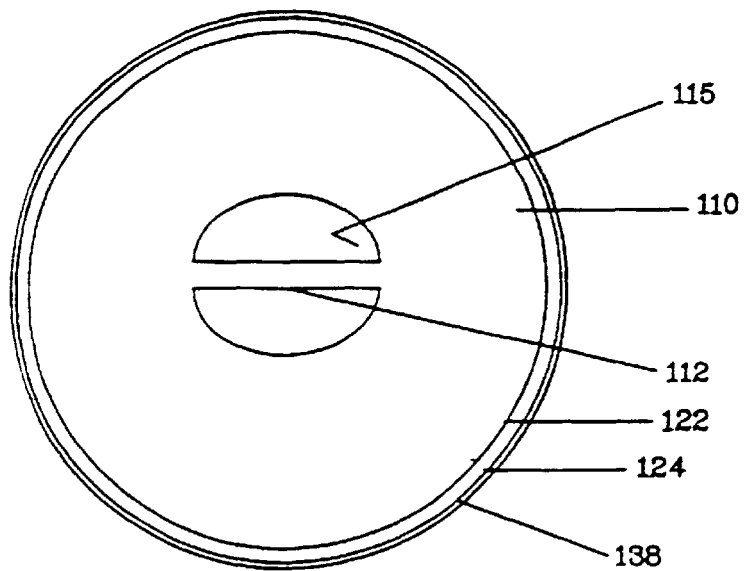
FIG. 2B is a top view of the lid cover of FIG. 2A along arrow A.

FIG. 1 is a side view of an assembled stack 1 of the rings 200, 300, 400, lid 100 and everyday type planar plates 10 of the novel invention where different types of food 1, 2, 3, 4, 5, 6, 7, 8, 9 can be positioned on the plates 10 and be evenly cooked when placed in a microwave oven 90. FIG. 2A is a side view of the lid cover 100 used in FIG. 1. FIG. 2B is a top view of the lid cover 100 of FIG. 2A along arrow A. Referring to FIGS. 1, 2A and 2B, lid cover 100 includes top cover portion 110 having a diameter of approximately 9.125 inches, with horizontal handle 112 and air-openings 115 about the handle 112. Side 120 slopes outward from a minimum top diameter 122 of approximately 9.125 inches to an enlarged middle 124 and bottom 136 diameter of approximately 9.382 inches. The height of uniform cylindrical portion 124-136 of lid 100 is approximately 0.637 inches. A rim 132, 138 having a diameter of approximately 9.689 inches is about bottom opening 130. The bottom opening 130 allows the lid cover 100 to be used as a top cover on a top plate 10 in stack 1 of FIG. 1. Lid cover has an overall height from top 110 to bottom rim 138 of approximately 2.075 inches. The walls of the lid 100 are approximately 0.063 inches thick. Lid cover 100 can be formed from injection molded microwaveable plastic such as polypropylene and the like.

Figure 3B:
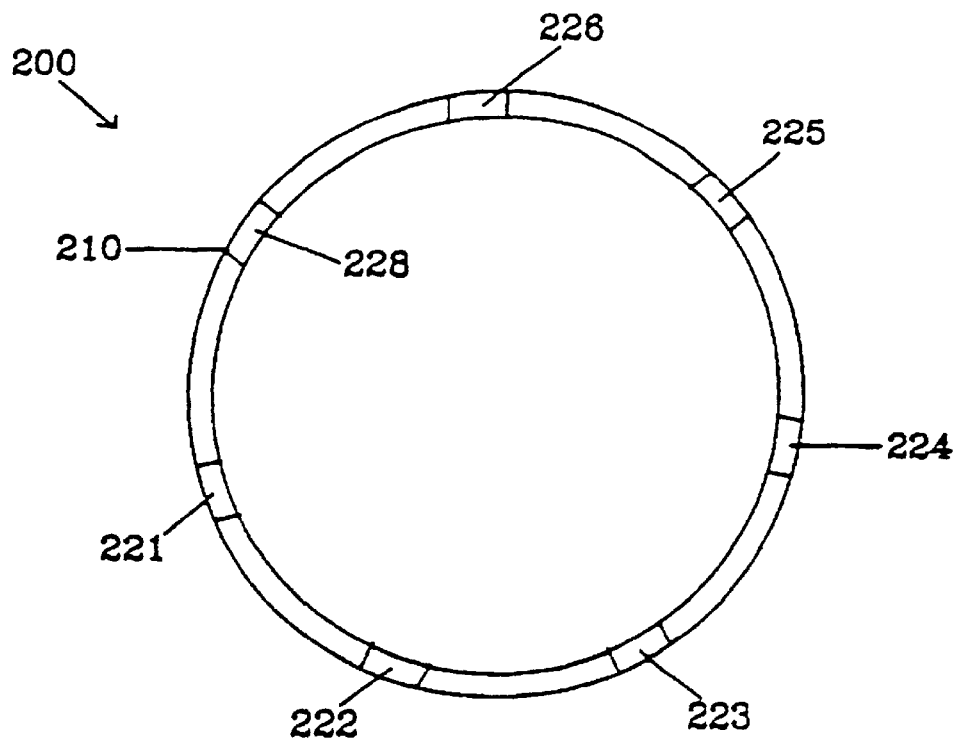
FIG. 3B is a top view of the ring of FIG. 3A along arrow B.
Figure 3A:
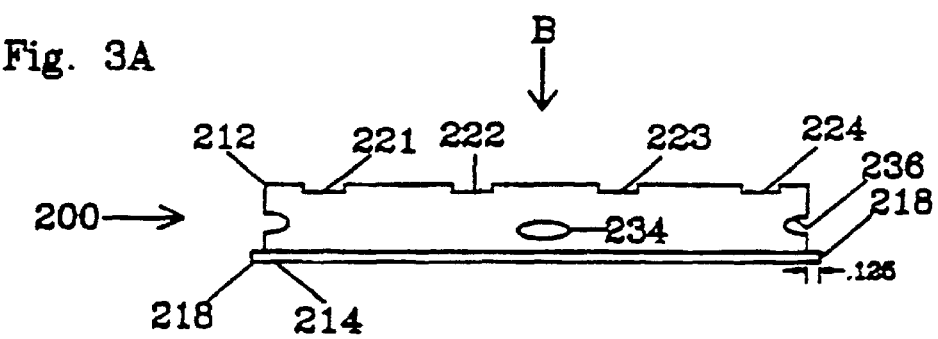
FIG. 3A is a side view of a ring used in FIG. 1.
Figure 3C:
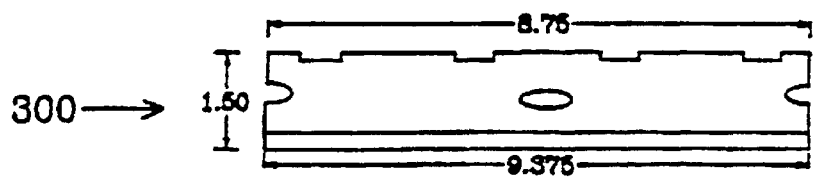
FIG. 3C is a side view of another ring used in FIG. 1.

FIG. 3A is a side view of a ring 200 used in FIG. 1. FIG. 3B is a top view of the ring 200 of FIG. 3A along arrow B. FIG. 3C is a side view of another ring 300 used in FIG. 1 which is identical to the previous shown ring 200. Referring to FIGS. 1 and 3A–3C, hollow ring 200 includes upper edge 212 having an inner diameter of approximately 8.75 inches with rectangular cut-out slots/vents 221, 222, 223, 224, 225, 226, 227, 228, each being approximately 0.5 inches wide by 0.125 inches high. The outer cylindrical side 210 slopes outward from upper edge 212 to base portion 214 which has a diameter of approximately 9.375 inches. An outer rim 218 encircles the base portion 214 which is approximately 0.125 inches wide by approximately 0.125 inches high. The side 210 of the ring is approximately 1.50 inches in height. Around the side 210 of ring 200 are equally spaced oval shaped vents similar to the slots/vents 221–228. The dimensions of hollow ring 300 are identical to that of hollow ring 200 described above. Referring to FIGS. 1–3B, the rectangular and oval slots/vents 221–228 and 232–236 and lid/cover through-holes 115 allow for food 1–9 on stacked plates 10 allow heat to be evenly dispensed over the food and relieves any pressure from building up. These slots/vents further help air circulation above each of the plates 10, so that one food taste does not contaminate another food taste among the different foods 1–9 on each of the plates 10. Furthermore, these slots/vents allow the user to put their fingers into the slots/vents to make it easier to move the hole stack 1 or parts thereof. Both the cover/lid 100 and the rings 200, 300 each can have thickness of the material used to be approximately 0.125 inches.

FIG. 4 is a perspective view of another hollow ring 400 for use with assembled stack 1 of FIG. 1 without side oval vents. Referring to FIG. 4, ring 400 includes upper edge 412 with rectangular cut-out slot/vents 421, 422, 423, 424, 425, 426 which correspond to slot/vents 321–326 described in the previous embodiment. Upper edge 412 can have an outer diameter of approximately 8.75 inches. Bottom edge 414 can have a diameter of approximately 8.904 inches, and rim 418 can have a diameter of approximately 9.25 inches. Ring side 410 and bottom edge 414, and rim 418 correspond to similar components labeled with respect to the preceding Figures.

Figure 5:
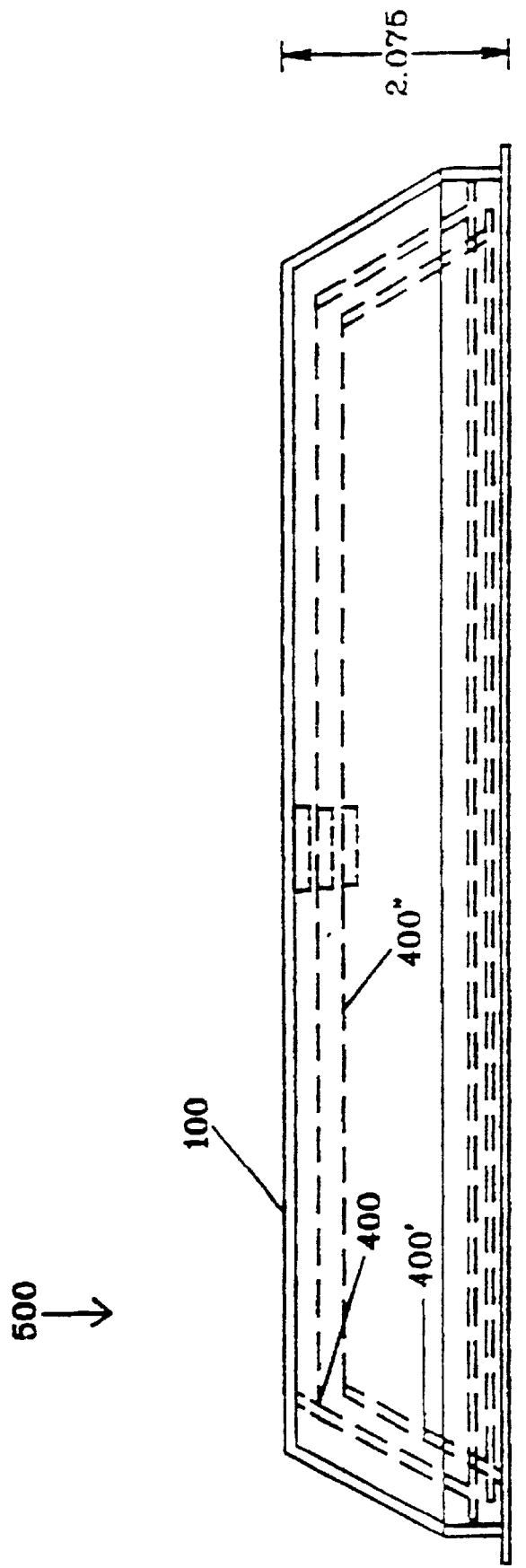
FIG. 5 is a side view of the lid cover and rings of the above Figures inserted in another for storage.

FIG. 5 is a side cross-sectional view 500 of the lid cover 100 and rings 400, 400', 400" of the above FIGS. 2A–2B and 4 inserted within one another for storage. The overall height of stacking the rings 400, 400', 400" when inserted within the bottom opening of lid cover 100 is approximately 2.075 inches.

Figure 6A:
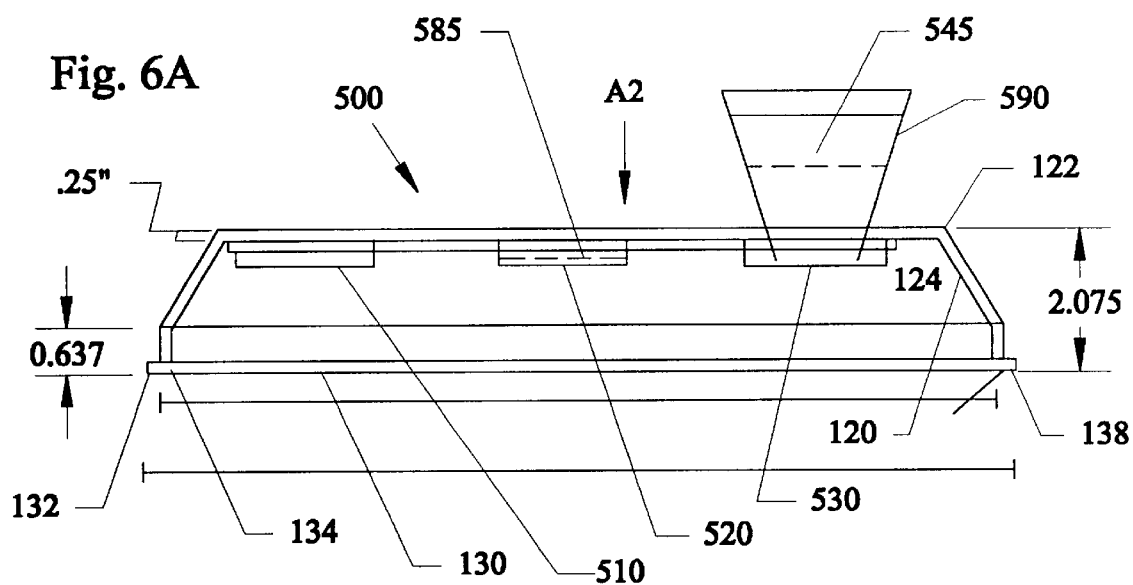
FIG. 6A is a side view of a second embodiment of the lid cover used in FIG. 1.
Figure 6B:
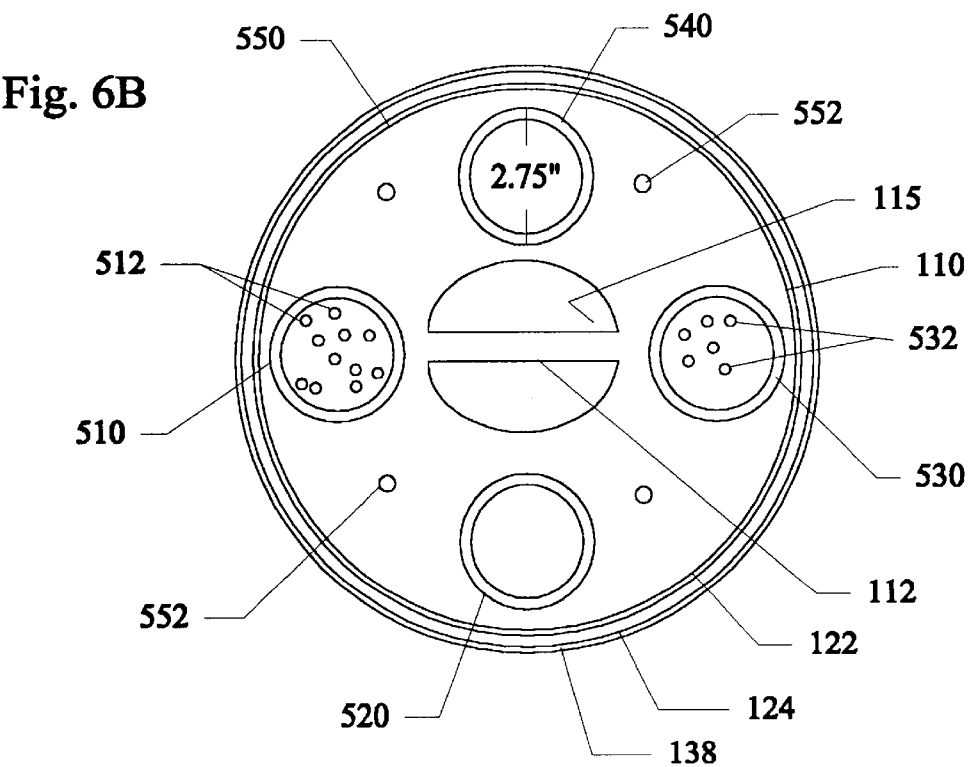
FIG. 6B is a top view of the lid cover of FIG. 6A along arrow A2.
Figure 7:
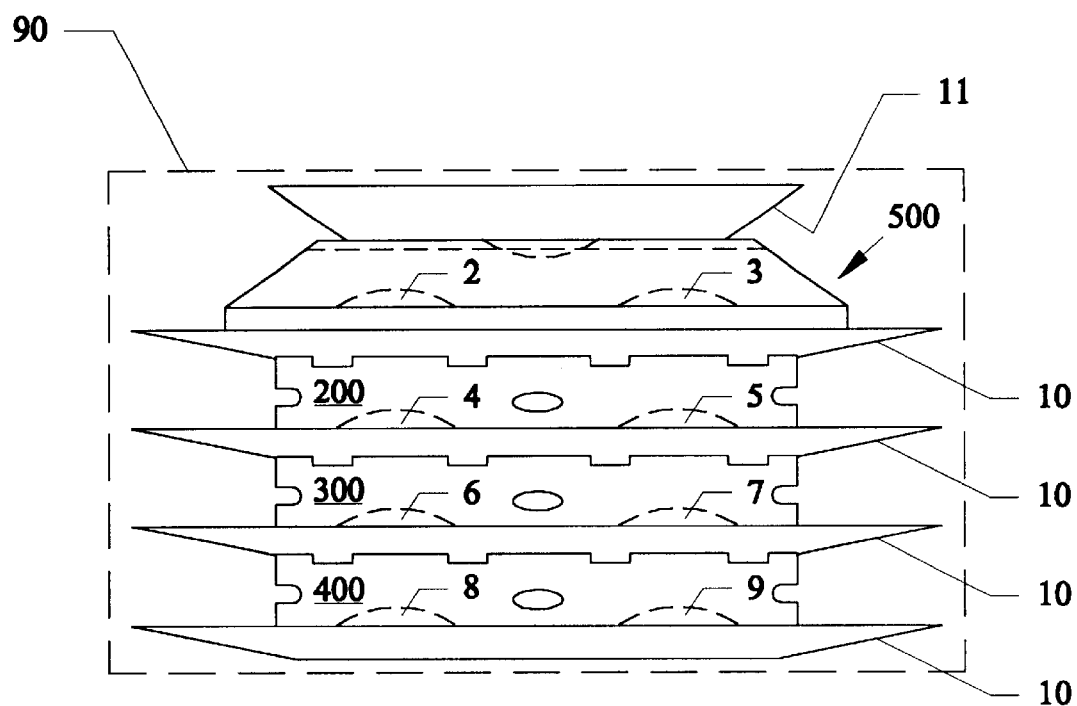
FIG. 7 is a side view of an assembled stack of the rings, lid and plates of FIGS. 6A–6B.

FIG. 6A is a side view of a second embodiment of the lid cover 500 that can be used as an alternative to the lid cover 100 shown in FIG. 1. FIG. 6B is a top view of the lid cover 500 of FIG. 6A along arrow A2. Referring to FIGS. 6A–6B, the lid cover 500 can include the same outer dimensions and features as that shown in the preceding figures, with the addition of the four cylindrical indentations 510, 520, 530 and 540. Each of the indentations can have diameters of up to approximately 2.75" or more, and internal depths of up to approximately 0.25" or more, in order to support and hold the bottom of cup holders such as but not limited to disposable cups 590, glasses, mugs, and the like. A beverage 595 such as water, tea, and the like, can be simultaneously heated in the microwave as the food within rings 200, 300, 400 is being heated. Additional cylindrical indentations 520, 540 can have solid bottoms so that additional liquid 585, such as water and the like, can be used in the microwave oven, since it well known that a container of water can be beneficial when using a microwave oven. The addition of water will help prevent scorching, burning, and the like, of the food and/or the plates, rings, and lid in high wattage microwaves. Cylindrical indentations 510 and 530 can include bottom through-hole perforations 512, 532 which can function like vents to allow air and heat to circulate when being used. Instead of perforations 512, 532, several through-hole perforations 552 through the indentation surface 550 allowing air and heat to circulate. A larger cylindrical indentation 550 can have a diameter of up to approximately 6.5" to approximately 8", with a depth of approximately 1/8" so that an additional plate 11 can be cooked in an uncovered state on top of lid cover 500. An uncovered plate can be useful for applications such as but not limited to browning, ordeauves, and the like. FIG. 7 is a side view of an assembled stack of rings and lid of FIGS. 6A–6B, with top uncovered plate 11.

Although the lid cover 500 shown in the preceding figures is shown in use with the stackable rings, the novel lid cover 500 can be used covering one plate 10 with a second plate 11 thereon. Additionally, the novel lid cover 500 can be used for covering one plate 10 with only a beverage container(s) 590 positioned thereon. Additionally, the lid cover 500 can be used without a plate 10 underneath, and be used for raising the plate 11, or the beverage container(s) 590 thereon.

Figure 8A:
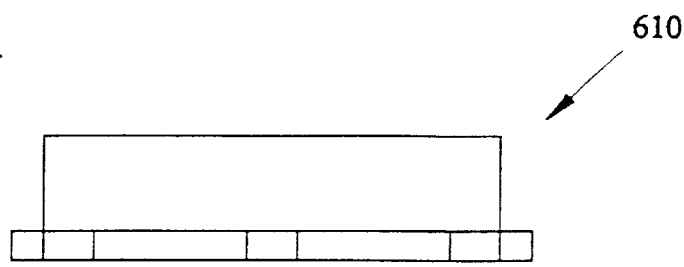
FIG. 8A is a side view of another embodiment of a lid cover for use with the invention.
Figure 8B:
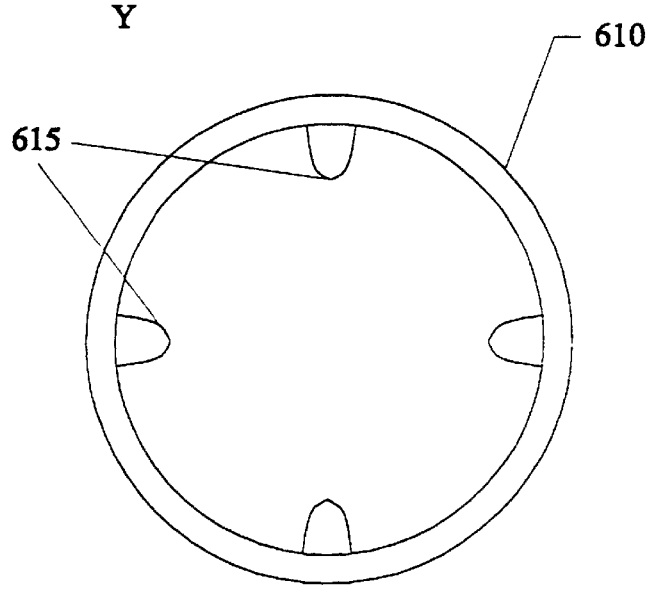
FIG. 8B is a bottom view of the lid cover of FIG. 8A with the internally facing snap protrusions.
Figure 8C:
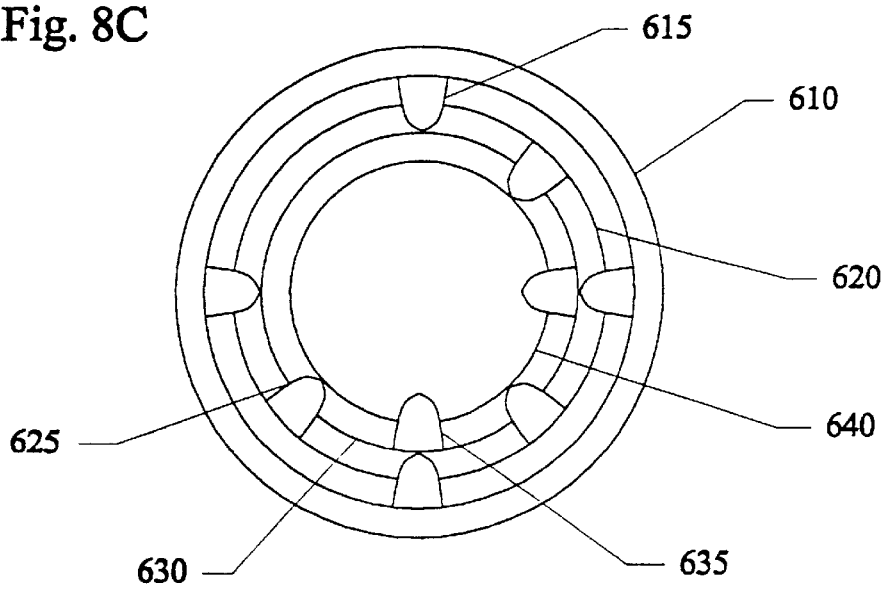
FIG. 8C is a bottom view of the lid cover of FIG. 8A–B, with additional co-axial hollow rings, each having internal facing snap protrusions.

FIG. 8A is a side view of another embodiment of a lid cover 610 for use with the invention. FIG. 8B is a bottom view of the lid cover of FIG. 8A along the direction of arrow Y, with the internally facing snap protrusions 615 that can be molded into the internal lower edge of the lid cover 610. Although four protrusions 615 are shown, less or more can be used as necessary. FIG. 8C is a bottom view of the lid cover 610 of FIG. 8A–B, with additional co-axial hollow rings 620, 630, each having internal facing snap protrusions 625, 635, and an internal hollow ring 640 all supported and held within the lid cover 610 so that the stored view of the stackable rings within the lid cover shown in FIG. 5 can be held together during nonuse of the invention. The edges of the lid cover 610 and hollow rings 620, 630, 640 can be flexible enough to push the lower edges of the respective rings above a protrusions 615, 625, 635.

Although, the Figures show internal protrusions on the lid cover and the hollow rings, only protrusion(s) on the inner edge of the lid cover can also be used wherein identical conical shaped hollow rings can be co-axially placed inside of one another and held within the lid cover by only the lid cover protrusion(s).

While the preferred embodiments have been described primarily with being used in a microwave oven, the invention can be used for storage purposes in a refrigerators/ freezers, and mobile type hot boxes, and anywhere where multiple stacks of plates need to be used in places such as but not limited to catering halls, ships, banquets and the like.

Although the preferred embodiments describe the hollow rings and lid as being cylindrical, these components can be other shapes such as rectangular, square, triangular, hexagonal, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A stacking arrangement for use with refrigerators and microwave ovens, comprising in combination:

a cover having a substantially closed planar lid portion and sides, the lid portion having an upper surface with a centrally located handle portion and at least two indentations thereon, the indentations for supporting at least a beverage container, and an exterior plate thereon, the cover having openings for allowing air to circulate therein the cover for being used for using the stacking arrangement in at least one of a refrigerator, and a microwave oven.

2. The stacking arrangement of claim 1, wherein the at least two indentations includes:

at least two circular indentations.

3. The stacking arrangement of claim 1, wherein the at least two indentations includes:

first circular indentations about a perimeter of the lid portion for supporting lower edges of beverage containers; and a second circular indentation larger than each of the first circular indentations for supporting the exterior plate thereon.

4. The stacking arrangement of claim 3, wherein at least one of the first circular indentation and the second circular indentation includes: perforations therethrough for allowing air to circulate.

5. The stacking arrangement of claim 1, further comprising:

a top plate, wherein the cover substantially covers substantially all of the upper surface of the top plate.

6. The stacking arrangement of claim 5, further comprising:

a first plate; and a first hollow ring, the first hollow ring being positioned on an upper edge of the first plate, and the top plate for substantially covering an upper surface of the first hollow ring, wherein the first hollow ring can be placed substantially inside of the cover.

7. The stacking arrangement of claim 6, further comprising:

a second plate; and a second hollow ring, the second hollow ring being positioned on an upper edge of the second plate, the second hollow ring for being positioned beneath the first plate.

8. The stacking arrangement of claim 6, wherein the cover includes:

an internal protruding portion on a bottom edge of the cover, the internal protruding portion for holding the first hollow ring within the cover when the first hollow ring and the cover are not being used.

9. The stacking arrangement of claim 1, wherein the one indentation includes:

a water layer so that scorching and burning can be prevented when the arrangement is placed in the microwave oven.

10. A stacking arrangement for placing plural plates into microwave ovens and refrigerators with a cover-lid and rings that can be stored inside one another when not being used, the arrangement comprising in combination:

a first plate;

a first hollow ring formed from a microwaveable material with spaces for allowing air to circulate inside the first hollow ring, the first hollow ring being positioned on an upper surface of the first plate;

a second plate positioned over the first hollow ring; and a cover formed from a microwaveable material with through-holes, the cover having a substantially closed lid portion and side for substantially covering an upper surface of the second plate, wherein the first ring and the cover lid allow the first plate and the second plate to be stacked on top of one another when placed in a microwave oven or a refrigerator, and the cover and the first hollow ring are storeable inside one another when not being used, the cover including at least one protruding internal portion, wherein the at least one internal protruding portion can hold the first hollow ring substantially inside of the cover when the first hollow ring and the cover are not being used.

11. The stacking arrangement of claim 10, further comprising:

a second plate;

a second hollow ring being positioned on an upper surface of the second plate, the first plate substantially covering the second hollow ring, wherein the at least one internal protruding portion can hold the first hollow ring and the second hollow ring inside of the cover when the first hollow ring, the second hollow ring and the cover are not being used.

12. The stacking arrangement of claim 10, wherein the lid includes:

at least one indentation thereon, the indentation for supporting at least one of: a beverage container, and a top plate thereon, the cover for being used for using the stacking arrangement in at least one of a refrigerator, and a microwave oven.

13. The stacking arrangement of claim 12, wherein the at least one indentation includes:

at least two circular indentations.

14. The stacking arrangement of claim 13, wherein the at least one indentation includes:

a first circular indentation for supporting lower edges of the beverage container; and a second circular indentation larger than the first circular indentation for supporting the top plate thereon.

15. The stacking arrangement of claim 12, wherein the indentation includes:

a water layer so that scorching and burning can be prevented when the arrangement is placed in the microwave oven.

16. A stacking arrangement for placing plural plates in microwave ovens and refrigerators having a cover-lid and rings that can be stored within the cover-lid when the rings and the cover-lid are not being used, the arrangement comprising in combination:

a first plate;

a first hollow ring formed from a microwaveable material having spaces for allowing air to circulate inside the first hollow ring, the first hollow ring being positioned on an upper surface of the first plate;

a second plate positioned over the first hollow ring; and a cover formed from a microwaveable material with spaces for allowing air to circulate therein, the cover having a substantially closed lid portion with sides for substantially covering an upper surface of the second plate, wherein the first ring and the cover lid allow the first plate and the second plate to be stacked on top of one another when placed in a microwave oven and a refrigerator, and the cover and the first hollow ring are storeable inside of one another when not being used, the lid portion including at least one upper exterior indentation thereon for supporting at least one of: a beverage container and an exterior plate thereon.

17. The stacking arrangement of claim 16, wherein the at least one upper exterior indentation includes:

a first indentation for supporting a beverage container; and a second indentation larger than the first indentation for supporting an exterior plate thereon.

18. The stacking arrangement of claim 17, further comprising:

a centrally located handle portion in the lid, wherein the first indentation includes at least two circular indentations about the centrally located handle portion.

19. The stacking arrangement of claim 16, wherein the indentation includes:

a water layer so that scorching and burning can be prevented when the arrangement is placed in the microwave oven.

* * * * *